M. E. LEEDS.
MEASURING APPARATUS.
APPLICATION FILED NOV. 18, 1912.
1,097,651.
Patented May 26, 1914.
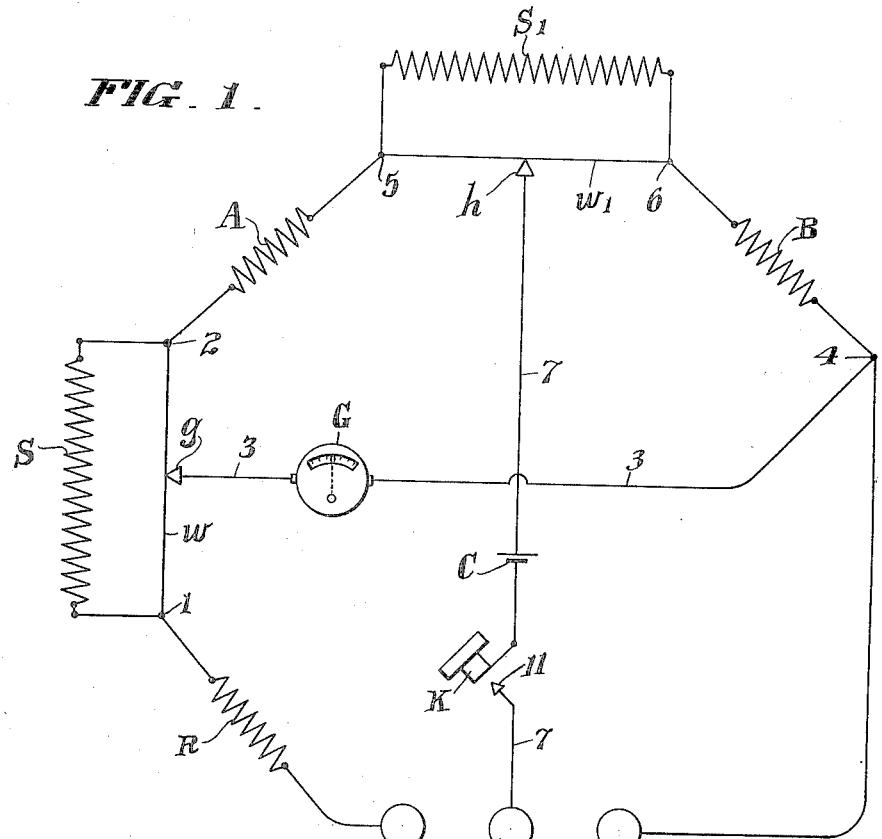
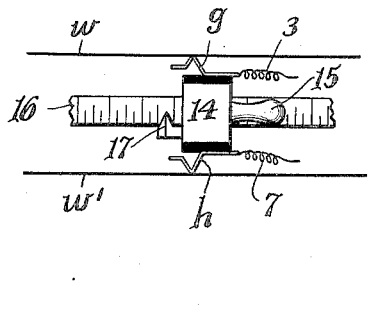
WITNESSES
INVENTOR
Morris E. Leeds
BY Cornelius D. Ehret
his ATTORNEY

UNITED STATES PATENT OFFICE.

MORRIS E. LEEDS, OF PHILADELPHIA, PENNSYLVANIA.

MEASURING APPARATUS.

1,097,651.  Specification of Letters Patent.  Patented May 26, 1914.

Application filed November 18, 1912. Serial No. 731,935.

*To all whom it may concern:*

Be it known that I, MORRIS E. LEEDS, a citizen of the United States, residing in the city of Philadelphia, county of Philadelphia, and State of Pennsylvania, have invented certain new and useful Improvements in Measuring Apparatus, of which the following is a specification.

My invention relates to electrical measuring apparatus involving the principle of the Wheatstone bridge.

My invention resides in apparatus of this character which may be used for the measurement of resistance generally, and which is particularly adaptable to the measurement of temperature, based upon the change in resistance of a conductor with change in temperature. And my invention resides further in apparatus of this character in which leads or conductors extending from the main part of the apparatus to the unknown resistance, such as a thermometer resistance, are so related, as hereinafter described, as to introduce no error into the determinations made by means of the apparatus. And it is a further feature of my invention, in this relation, to so employ relatively movable contacting parts that the contact resistance introduces no error into the determinations made by the apparatus.

My invention resides in the features hereinafter described and claimed.

For an illustration of one of the forms my invention may take, reference is to be had to the accompanying drawing, in which:

Figure 1 is a diagrammatic view illustrating the circuits and parts of my apparatus. Fig. 2 is a view illustrating an example of means for moving the movable contacts in unison.

Referring to Fig. 1, A and B represent resistances in the ratio arms of a Wheatstone bridge and R and T represent resistances in the other arms of the bridge, the former, R, a known resistance and the latter, T, representing the unknown resistance, or, in the case of temperature measurement, the resistance of a resistance thermometer. Between the bridge arms including the resistances R and A is connected the resistance $w$ extending from the point 1 to the point 2, this resistance $w$ taking any suitable form, here illustrated as a straight slide wire resistance. Engaging and adapted to traverse this resistance $w$ and to shift the point of junction between the bridge arms including resistances R and A is a movable contact $g$ forming one terminal of a conjugate conductor 3 whose other terminal is at 4 at the junction of the bridge arms containing the resistances B and T, the conductor 3 including a galvanometer or other suitable indicating instrument G. And connected between the bridge arms including the resistances A and B is a second slide wire or similar resistance $w^1$ extending from point 5 to point 6, the resistance $w^1$ being engaged and adapted to be traversed by the sliding contact $h$ forming one terminal of the conjugate conductor 7 whose other terminal is at the point 8 at the junction between the bridge arms including the resistances R and T. The position of contact $h$ determines the point of junction between the bridge arms including the resistances A and B. The conductor 7 terminates in the apparatus itself at the binding post 9 from which extends the lead 10 to the point 8, the lead 10 being in effect a part of the conjugate conductor 7. Connected in this conjugate conductor 7 is a battery or other source of current C and a switch or key which when depressed engages the contact point 11 to close the normally open circuited conductor 7. 12 and 13 represent binding posts to which are connected the thermometer leads L, one in each of the bridge arms including the resistances R and T. These leads L are of equal resistances, and since they extend from the bridge apparatus proper to the more or less distant thermometer resistance T, are preferably made of the same length of conductor, of the same material, and of the same cross section. The leads L, and the lead or conductor 10 may be disposed in a cable, or in a braid or twist, the effect being, as to the leads L, L that they are subjected to the same temperatures throughout their lengths and therefore continue to exhibit equal resistances.

It is necessary that the resistances in the bridge arms including the resistances A and B shall at all times be equal to each other in order that the leads L, L may rigidly compensate each other and introduce no error. This follows from the equation for the Wheatstone bridge as follows:

$$\frac{a}{b} = \frac{c+L}{d+L} \quad (1)$$

where $a$ is the resistance of the bridge arm including the resistance A; $b$ the resistance of the bridge arm including the resistance of B; $c+L$ being the resistance of the bridge arm including one lead L and the resistance R; and $d+L$ being the resistance of the bridge arm including the other lead L and the resistance T, L representing the resistance of each lead. In order that the two resistances L in the above equation may cancel out, it is necessary that $$c+L=d+L \quad (2)$$

and this can only be true when $$a=b \quad (3)$$

It is accordingly a necessary condition that the resistance in the ratio arms of the bridge shall be equal to each other, if the bridge apparatus is to be used to measure a resistance at a distance where lead wires are necessarily used, and these leads or lead wires are not to affect the accuracy of the measurements.

Where the thermometer or other resistance T is of relatively low value, or where the resistance of T varies through a small range, it is not desirable to balance the bridge by changing the amount of the resistance R by means of a contact sliding on it and in series with R in the same arm of the bridge, since the resistance of the contact itself may be large enough to introduce an error. It is desirable to effect the balance of the bridge by shifting contacts which cannot introduce any contact resistance into the bridge arms. Accordingly I effect the balance of the bridge by one or more of the sliding contacts, as $g$ and $h$, associated with the conjugate conductors, contact resistance between these sliding contacts and their cooperating resistance conductors introducing no change in resistance, so far as contacts are concerned, into the bridge arms.

I accomplish the two results desired, namely the maintenance of unity ratio between the arms including resistance A and B and the balancing of the bridge without introducting contact resistance into any of the bridge arms by the arrangement shown in Fig. 1.

For the purposes of illustration let it be assumed that the resistance $w$ consists of 1,000 units of resistance, each unit having a resistance $r$. The resistance of the slide wire or other conductor $w^1$ has a resistance one-half that of resistance conductor $w$. Accordingly let it be assumed that the resistance conductor $w^1$ has a resistance of one thousand (1,000) units, each unit being of a resistance $\frac{r}{2}$.

By mechanical construction, hereinafter described, the two movable contacts $g$ and $h$ move in unison with each other so that when the contact $g$ is at point 1 the movable contact $h$ will be at point 5, and when the movable contact $g$ is half way along the conductor $w$, that is, mid-way between points 1 and 2, the movable contact $h$ will be one-half way along the conductor $w^1$, that is, mid way between the points 5 and 6. And in constructing the apparatus the resistances A, $w^1$, and B are made such that $$A+\frac{1000r}{2}=B \quad (4)$$

The bridge equation now becomes:

$$\frac{A+\frac{nr}{2}+(1000-n)r}{B+(1000-n)\frac{r}{2}}=\frac{R+nr+L}{T+L} \quad (5)$$

where $n$ represents the number of scale divisions or units of resistance traversed by contact $g$ away from the point 1, or half units of resistance traversed by contact $h$ away from point 5.

Substituting in equation (5) for B its value obtained from equation (4), we find that the first member of equation (5) becomes:

$$\frac{A-\frac{nr}{2}+1000r}{A-\frac{nr}{2}+1000r} \quad (6)$$

which is unity, as stated above to be a necessity.

Then since the first member of equation (5) is unity we have:

$$1=\frac{R+nr+L}{T+L} \quad (7)$$

from which follows:

$$T=R+nr \quad (8)$$

and $$n=\frac{T-R}{r} \quad (9)$$

By preference I make the resistance R substantially equal to the resistance T, in temperature measurements, when the resistance T is at the lowest temperature of the temperature range of the apparatus as a whole. That is to say, if the apparatus is to be used for measurements of temperature from 100 degrees to 1000 degrees centigrade, I use for R a resistance substantially equal to the resistance of T at 100 degrees centigrade.

As stated above, the movable contacts $g$ and $h$ are moved in unison over their cooperating resistance conductors $w$ and $w^1$, respectively. This may be accomplished as indicated in Fig. 2 where the contacts $g$ and $h$ are secured to the same member 14, and insulated from each other. The member 14 is movable by handle 15 backwardly and forwardly in the direction of the conductors $w$ and $w^1$. A scale 16 may be provided with which coöperates a pointer 17 movable with the member 14. This scale may be calibrated in any desired units, such as resistance units, temperature units, or empirical units.

I have shown in shunt to the conductors $w$ and $w^1$ the resistances S and $S^1$ respectively. These are employed to secure between the points 1 and 2 and the points 5 and 6 the exact amount of resistance required. If conductors $w$ and $w^1$ are not of the exact resistance required, the shunt resistances may be employed of the right amount to secure the proper resistances between the points 1 and 2 and the points 5 and 6. In other words S and $S^1$ are resistances for facilitating adjustment of the resistances, between the points named. However, if resistances $w$ and $w^1$ are of correct values, the shunts S and $S^1$ may be omitted.

The operation of the apparatus is as follows: The resistance T is placed in the atmosphere or material or medium whose temperature is to be measured and on attaining such temperature exhibits a certain resistance. The contacts $g$ and $h$ are moved by handle 15 backwardly and forwardly along the wires $w$ and $w^1$ until, with the key K in engagement with contact 11, the galvanometer or other instrument G indicates no current flow in the conductor 3, in which case the bridge is in balance. Then the reading of the scale for the position of the pointer 17 is taken and if the scale is calibrated in temperature units, the temperature is read directly from the scale. Or if the scale be divided into resistance units the resistance change of the resistance T is read or determined from the scale, in accordance with equation (8), and then from a calibration curve of the resistance T, the temperature corresponding to the determined resistance of T is read off. It is to be understood that the source of current or battery C and the galvanometer or indicating instrument G may be interchanged by putting the source C in conductor 3 and the galvanometer in conductor 7. And instead of moving contacts $g$ and $h$, they may remain stationary, and the conductors $w$ and $w^1$ (which may be on a rotating disk or cylinder) moved with respect to contacts $g$ and $h$.

It will be noted that in the construction described, as resistance is introduced into the bridge arm including resistance R by moving contact $g$ toward point 2, resistance is simultaneously removed from the ratio arm including resistance A and resistance introduced at one-half the rate into the same ratio arm by movement of contact $h$ toward point 6. And simultaneously resistance is being removed from the ratio arm including resistance B. And the resistance of the arm including the resistance T is varied only by the change in the resistance of T due to temperature changes; and that whatever changes occur in the resistance of the leads L, L, due to temperature changes, their effects are canceled and have no effect upon the accuracy of the measurement.

What I claim is:

1. The combination with a Wheatstone bridge and its source of current and galvanometer, of a resistance intervening between the ratio arms of said bridge, a second resistance intervening between one of said ratio arms and a third arm of said bridge, and means for adjusting terminals of conjugate conductors of said bridge with respect to said intervening resistances for maintaining fixed the ratio between the resistances of the ratio arms of said bridge.

2. The combination with a Wheatstone bridge and its source of current and galvanometer, of a resistance intervening between the ratio arms of said bridge, a second resistance intervening between one of said ratio arms and a third arm of said bridge, and means for adjusting terminals of conjugate conductors of said bridge with respect to said intervening resistances for maintaining equality between the resistances of said ratio arms.

3. The combination with a Wheatstone bridge and its source of current and galvanometer, of a resistance intervening between the ratio arms of said bridge, a second resistance intervening between one of said ratio arms and a third arm of said bridge, and means for adjusting terminals of conjugate conductors of said bridge with respect to said intervening resistances for changing said first named intervening resistance at one-half the rate of change of said second intervening resistance.

4. The combination with a Wheatstone bridge and its source of current and galvanometer, of a resistance intervening between the ratio arms of said bridge, a second resistance intervening between one of said ratio arms and a third arm of said bridge, means for adjusting terminals of conjugate conductors of said bridge with respect to said intervening resistances for maintaining equality between the resistances of said ratio arms, an unknown resistance in the fourth arm of said bridge, and leads of equal resistances in said third and fourth arms of said bridge extending to said unknown resistance.

5. The combination with a Wheatstone bridge and its source of current and galvanometer, a resistance intervening between the ratio arms of said bridge, a resistance intervening between a ratio arm of said bridge and a third arm of said bridge, contacts forming terminals of the conjugate conductors of said bridge, and means for causing relative movement between said contacts and said intervening resistances in unison.

6. The combination with a Wheatstone bridge and its source of current and galvanometer, a resistance intervening between the ratio arms of said bridge, a resistance intervening between a ratio arm of said bridge and a third arm of said bridge, contacts forming terminals of the conjugate conductors of said bridge, and means for causing relative movement between said contacts and said intervening resistances in unison, the ratio of the resistances in said ratio arms remaining constant for all adjustments of said contacts with respect to said intervening resistances.

7. The combination with a Wheatstone bridge and its source of current and galvanometer, a resistance intervening between the ratio arms of said bridge, a resistance intervening between a ratio arm of said bridge and a third arm of said bridge, and means for causing relative movement between said contacts and said intervening resistances in unison, the ratio of the resistances in said ratio arms remaining unity for all adjustments of said intervening resistances.

8. The combination with a Wheatstone bridge and its source of current and galvanometer, a resistance intervening between the ratio arms of said bridge, a resistance intervening between a ratio arm of said bridge, and a third arm of said bridge, and means for causing relative movement between said contacts and said intervening resistances in unison, a given relative movement between said contacts and intervening resistances producing double the change of resistance in said second intervening resistance that is produced in said first intervening resistance.

9. The combination with a Wheatstone bridge and its source of current and galvanometer, of a resistance intervening between the ratio arms of said bridge, a second resistance intervening between a ratio arm of said bridge and a third arm of said bridge and having a resistance value twice that of said first named resistance, contacts forming terminals of the conjugate conductors of said bridge, and means for moving said contacts in unison with respect to said intervening resistances.

10. The combination with a Wheatstone bridge and its source of current and galvanometer, of means for maintaining the ratio of the resistances in the ratio arms of said bridge at unity comprising resistances intervening between different arms of said bridge, and contacts forming terminals of the conjugate conductors of said bridge traversing said intervening resistances in unison.

11. The combination with a Wheatstone bridge and its source of current and galvanometer, of means for maintaining the ratio of the resistances in the ratio arms of said bridge at unity comprising resistances intervening between different arms of said bridge, and contacts forming terminals of the conjugate conductors of said bridge traversing said intervening resistances in unison, an unknown resistance and a lead in one arm of said bridge, a second lead in another arm of said bridge, said leads being of equal resistances, and a third lead in a conjugate conductor of said bridge.

12. The combination with a Wheatstone bridge and its source of current and galvanometer, of an unknown resistance and a lead in one arm of said bridge, a resistance and a second lead in another arm of said bridge, said leads being of equal resistances, a resistance intervening between the ratio arms of said bridge, a resistance intervening between one of said ratio arms and the arm of said bridge including said second lead, contacts forming terminals of the conjugate conductors of said bridge, and means for moving said contacts in unison with respect to said intervening resistances.

13. The combination with a Wheatstone bridge and its source of current and galvanometer, of fixed resistances in the ratio arms of said bridge, a resistance intervening between said ratio arms, the fixed resistance in the first ratio arm plus said intervening resistance equaling the fixed resistance in the second ratio arm, and a second resistance intervening between said first ratio arm and a third arm of said bridge, said second intervening resistance having twice the value of said first named intervening resistance.

14. The combination with a Wheatstone bridge and its source of current and galvanometer, of fixed resistances in the ratio arms of said bridge, a resistance intervening between said ratio arms, the fixed resistance in the first ratio arm plus said intervening resistance equaling the fixed resistance in the second ratio arm, a second resistance intervening between said first ratio arm and a third arm of said bridge, said second intervening resistance having twice the value of said first named intervening resistance, contacts forming terminals of the conjugate conductors of said bridge, and means for moving said contacts in unison with respect to said intervening resistances.

15. The combination with a Wheatstone bridge and its source of current and galvanometer, of an unknown resistance and a lead in one arm of said bridge, a resistance and a second lead in another arm of said bridge, said leads being of equal resistances, resistance adjusting means for maintaining the ratio of the resistances in the ratio arms of said bridge at unity comprising resistances intervening between different arms of said bridge, and contacts traversing the same and forming terminals of the conjugate conductors of said bridge, and a scale associated with said resistance adjusting means, said scale giving a reading when said bridge is balanced determinant of said unknown resistance.

16. The combination with a Wheatstone bridge and its source of current and galvanometer, of an unknown resistance and a lead in one arm of said bridge, a resistance and a second lead in another arm of said bridge, means for balancing said bridge while maintaining the resistance in the ratio arms of said bridge at unity comprising resistances intervening between different arms of said bridge and contacts traversing the same and forming terminals of the conjugate conductors of said bridge, and a scale associated with said balancing means, said scale giving a reading determinant of said unknown resistance when said bridge is balanced.

17. The combination with a Wheatstone bridge and its source of current and galvanometer, a slide wire resistance intervening between the ratio arms of said bridge, a second slide wire resistance intervening between one of said ratio arms and a third arm of said bridge, contacts forming terminals of the conjugate conductors of said bridge, and means for causing relative movement between said contacts and said slide wire resistances in unison.

In testimony whereof I have hereunto affixed my signature in the presence of the two subscribing witnesses.

MORRIS E. LEEDS.

Witnesses:
  CHAS. S. REDDING,
  WM. M. C. KIMBER.